(12) United States Patent
Park et al.

(10) Patent No.: US 7,231,121 B2
(45) Date of Patent: Jun. 12, 2007

(54) OPTICAL FIBER HAVING REDUCED RESIDUAL STRESS DISCONTINUITY

(75) Inventors: Se Ho Park, Gumi-si (KR); Jin-Haing Kim, Gumi-si (KR)

(73) Assignee: Samsung Electronics Co., Ltd., Suwon-Si, Gyednggi-Do (KR)

( * ) Notice: Subject to any disclaimer, the term of this patent is extended or adjusted under 35 U.S.C. 154(b) by 15 days.

(21) Appl. No.: 10/919,731

(22) Filed: Aug. 17, 2004

(65) Prior Publication Data
US 2005/0180709 A1    Aug. 18, 2005

(30) Foreign Application Priority Data
Feb. 13, 2004    (KR) .................. 10-2004-0009520

(51) Int. Cl.
*G02B 6/02* (2006.01)
(52) U.S. Cl. .............. 385/123; 385/124; 385/125; 385/126; 385/127; 385/128
(58) Field of Classification Search .......... 385/11, 385/142, 124, 127, 123
See application file for complete search history.

(56) References Cited

U.S. PATENT DOCUMENTS

| | | | |
|---|---|---|---|
| 4,358,181 A | 11/1982 | Gulati et al. .......... 350/96.31 |
| 4,478,623 A | 10/1984 | Olshansky ............. 65/3.12 |
| 5,175,785 A * | 12/1992 | Dabby .................. 385/123 |
| 6,078,715 A * | 6/2000 | Fujii et al. ............ 385/124 |
| 6,175,680 B1 * | 1/2001 | Arai et al. ............. 385/127 |
| 6,400,878 B1 * | 6/2002 | Nagayama et al. ..... 385/123 |
| 6,535,676 B1 * | 3/2003 | de Montmorillon et al. .... 385/123 |
| 6,591,050 B2 * | 7/2003 | Fleury et al. .......... 385/123 |
| 6,625,370 B2 * | 9/2003 | Itoh et al. .............. 385/132 |
| 6,922,495 B2 * | 7/2005 | Sorin et al. ............ 385/11 |
| 2001/0022873 A1 | 9/2001 | Kim et al. |
| 2003/0044158 A1 * | 3/2003 | King et al. ............. 385/142 |
| 2004/0170366 A1 * | 9/2004 | Takahashi et al. ...... 385/127 |
| 2005/0089289 A1 * | 4/2005 | Hayami et al. ......... 385/127 |

FOREIGN PATENT DOCUMENTS

| | | |
|---|---|---|
| EP | 0055822 | 4/1986 |
| WO | WO 00/50936 | 8/2000 |

OTHER PUBLICATIONS

Tetsuji Abe et al.; "Axial Residual Stress Measurement for Silica Opitcal Fibers Using A Polariscope;" 13th Congress of the International Commission for Optics; 1984; XP009046544; 2 pgs.

* cited by examiner

*Primary Examiner*—Frank G. Font
*Assistant Examiner*—Guy G. Anderson
(74) *Attorney, Agent, or Firm*—Cha & Reiter, L.L.C.

(57) ABSTRACT

An optical fiber having reduced residual stress discontinuity is disclosed. The optical fiber includes a core which is an optical transmission medium and a clad for surrounding the core. The residual stress discontinuity at an interface between the core and the clad is 20.0 MPa or less, which is represented by an absolute value of a difference between a minimum axial stress at (r/a)=0.8-1.1 and a maximum axial stress at (r/a)=1.0-1.2, wherein a is the radius of the core and r is a radius measured from the center of the core.

6 Claims, 10 Drawing Sheets

OPTICAL FIBER HAVING REDUCED RESIDUAL STRESS DISCONTINUITY

CLAIM OF PRIORITY

This application claims priority to an application entitled "optical fiber having low residual stress discontinuity," filed with the Korean Intellectual Property Office on Feb. 13, 2004 and assigned Serial No. 2004-9520, the contents of which are hereby incorporated by reference.

BACKGROUND OF THE INVENTION

1. Field of the Invention

The present invention relates to an optical transmission medium, and more particularly to an optical fiber.

2. Description of the Related Art

Conventional processes for manufacturing optical fibers are generally divided into a preform manufacturing process and a drawing process. In the drawing process, the drawing temperature that is used has a great influence on residual stress, which occurs at an interface between a core and a clad of the optical fibers. Varying residual stress affects various optical characteristics. Therefore, it is of a great importance to control the residual stress using the drawing temperature. Otherwise, composition of the optical fibers should be designed in such a manner that the residual stress is not affected by the drawing temperature.

However, optical fibers (including Ethernet optical fibers of 10 Mbps, 100 Mbps, 1 Gbps, and 10 Gbps), which are mainly used as optical transmission media for an access network, a FTTH (fiber-to-the-home), a LAN, or a WAN, are supposed to pass through many curved areas when they are installed in conduit lines, buildings, or complicates office rooms for installation and operation. Such curved areas should not affect the loss, which is one of the important factors in communications.

FIG. 1 shows a typical optical fiber having a graded index distribution. The optical fiber 110 includes a core 120 and a clad 130, which surrounds the core 120. The index distribution of the core 120 is given below as Equation 1 and the modal bandwidth of the optical fiber 110, which is one of the important optical characteristics, is greatly influenced by the value of $\alpha$ in the equation.

$$n = n_1(1 - 2\Delta(r/a)^\alpha)^{1/2} \quad \text{(Equation 1)}$$

In the above equation, n is the index of the core 120 of the optical fiber 110; $n_1$ is the index at the center (r=0) of the core 120; $\Delta$ is a relative index difference; a is the radius of the core 120; r is a radius measured from the center of the core 120; and $\alpha$ is a core form factor. The $\alpha$ is sensitive to the residual stress discontinuity at the interface (r/a=1) between the core 120 and the clad 130. In particular, the residual stress discontinuity is greatly influenced by a difference in composition between the core 120 and the clad 130 or by the optical fiber's drawing conditions, such as heating temperature, cooling rate, and drawing rate.

Conventional technologies regarding bending loss of optical fibers include methods for reducing the bending loss of single-mode optical fibers, mainly by modifying the index structure of their core and clad. However, no method is known in the art for controlling the residual stress discontinuity.

U.S. Pat. No. 4,412,722 of Carnevale, et al, entitled "Single-mode fiber with graded index of refraction," discloses a method for fabricating a single-mode optical fiber having a core with a graded index distribution. U.S. Pat. No. 4,838,643 of Hodges, et al, entitled "Single-mode bend insensitive fiber for use in fiber optic guidance applications," discloses a structure having depressed regions or isolated trenches in parts of a clad area. U.S. Pat. No. 5,032,001 of Shang, entitled "Optical fiber having enhanced bend resistance," discloses a structure having raised areas and depressed areas in a clad area. U.S. Pat. No. 5,278,931 of Antos, et al, entitled "Low bend loss single-mode optical waveguide fiber," discloses a method wherein the index of an inner core is increased to reduce a MFD (mode field diameter), while maintaining zero-dispersion wavelength; a diffusion tail effect is reduced at an interface between a core and a clad to suppress the increase in an unnecessary cut-off wavelength and the MFD; or a ring structure is applied to an external area to suppress the increase in the zero-dispersion wavelength, which is caused by the increase in an outer core index. U.S. Pat. No. 5,175,785 of Dabby, entitled "Optical waveguides having reduced bending loss and method of making the same," discloses a structure capable of supporting a dual mode or a multi mode by using a virtual single-mode structure, the cut-off wavelength of which is substantially larger than the zero-dispersion wavelength, and decreasing the index difference between a core and a clad thereof.

As mentioned above, conventional optical fibers have a problem in that they exhibit severe changes in residual stress, depending on drawing conditions, at an interface between their core and clad. In addition, conventional optical fibers have large bending loss even in the case of a small bending (diameter of about 10 mm), which occurs at recent access networks, FTTHs, LANs, or WANs.

SUMMARY OF THE INVENTION

One aspect of the present invention relates to an optical fiber having low residual stress discontinuity at an interface between its core and clad.

Another aspect of the present invention relates to an optical fiber having reduced bending loss as compared to conventional optical fibers.

Still another aspect of the present invention relates to an optical fiber that is not sensitive to drawing conditions, including heating temperature, drawing rate, and cooling rate.

One embodiment of the present invention is directed to an optical fiber including a core which is an optical transmission medium and a clad for surrounding the core. The residual stress discontinuity at an interface between the core and the clad is 20.0 MPa or less, which is represented by an absolute value of a difference between a minimum axial stress at (r/a)=0.8-1.1 and a maximum axial stress at (r/a)=1.0-1.2, wherein a is the radius of the core and r is a radius measured from the center of the core.

Another embodiment of the present invention is directed to an optical fiber including a core that is an optical transmission medium and consists essentially of $SiO_2$ and $GeO_2$ and a clad which surrounds the core.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted when it may obscure the subject matter of the present invention.

Figure 1:
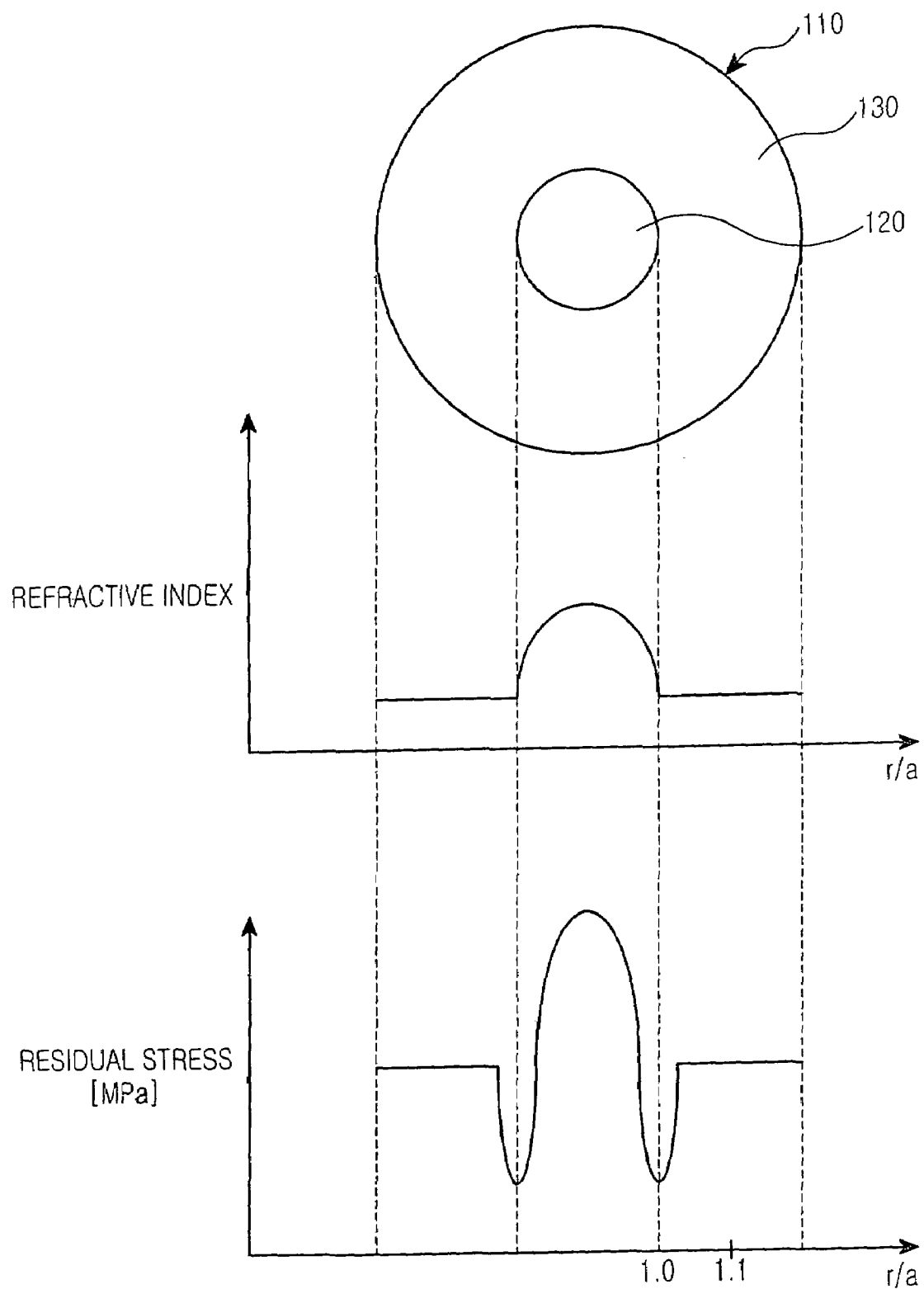
FIG. 1 shows a typical optical fiber having a graded index distribution.
Figure 2:
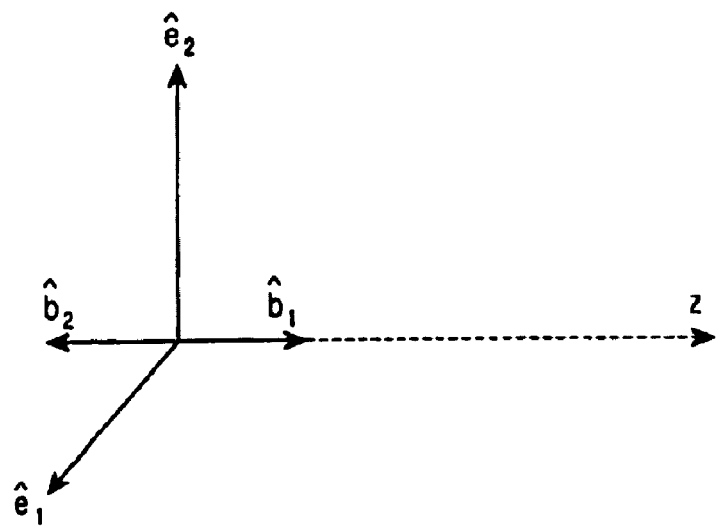
FIG. 2 shows a residual stress mismatch of an optical fiber having a graded index distribution.

FIG. 2 shows a residual stress mismatch of an optical fiber having a graded index distribution. The optical fiber includes a core and a clad. In FIG. 2, z is a propagation axis; $\hat{e}_1$ is an eigenvector of a core mode; $\hat{e}_2$ is an eigenvector of a clad mode; $\hat{b}_1$ is a birefringence vector of the core; and $\hat{b}_2$ is a birefringence vector of the clad.

The eigenvector of the core mode satisfies the following equation:

$$\langle \hat{e}_i | \hat{e}_j \rangle = 0 \quad \text{(Equation 2)}$$

wherein, i≠j; i,j=1 or 2; 1 refers to the core mode; and 2 refers to the clad mode.

The eigenvectors of the core mode and the clad mode have a relationship as follows:

$$\langle \hat{e}_i | \hat{b}_j \rangle = 0 \quad \text{(Equation 3)}$$

wherein, i≠j and i,j=1 or 2.

A coupling between a core mode due to birefringence and a clad mode is given as follows:

$$\langle \hat{e}_i | H_b | \hat{e}_j \rangle = \langle \hat{e}_i | H_b^2 + H_b^1 | \hat{e}_j \rangle = \hat{e}_i \times \hat{b}_2 \cdot \hat{e}_j + \hat{e}_j \times \hat{b}_1 \cdot \hat{e}_i \quad \text{(Equation 4)}$$
$$= \hat{e}_i \times \hat{b}_2 \cdot \hat{e}_j - \hat{b}_1 \cdot \hat{e}_i \times \hat{e}_j = \hat{e}_i \times \hat{e}_j \cdot (\hat{b}_2 - \hat{b}_1)$$

wherein, i≠j; i,j=1 or 2; and $H_b$ is a mode coupling Hamiltonian operator regarding birefringence.

The bending loss is given as follows:

$$\alpha_b \propto |\langle \hat{e}_i | H_b | \hat{e}_j \rangle|^2 \exp(-r/r_b) \propto |\hat{e}_1|^2 |\hat{e}_2|^2 |\hat{b}_2 - \hat{b}_1|^2 \exp(-r/r_b) \quad \text{(Equation 5)}$$

wherein, i≠j; i,j=1 or 2; r is a bending radius; and $r_b$ is a critical bending radius.

From Equation 5, it is clear that the larger a difference in birefringence between the core and the clad ($|\hat{b}_2 - \hat{b}_1|$) is, the larger the bending loss is. If the bending loss is the same, the larger a difference in birefringence between the core and the clad is, the larger the critical bending radius is. As the critical bending radius becomes larger, it becomes more likely that the bending loss will be increased during the installation and operation of lines and installation conditions will be limited. Therefore, the difference in birefringence between the core and the clad should be decreased for low bending loss. In general, the value of $|\hat{e}_1|^2 |\hat{e}_2|^2$ is maximized near an interface between the core and the clad. The difference in birefringence between the core and the clad ($|\hat{b}_2 - \hat{b}_1|$) dominates the bending loss. Accordingly, the difference in birefringence between the core and the clad should be decreased for low bending loss.

The distribution of birefringence within optical fibers may be varied according to composition and residual stress of the core and the clad. For example, the core and the clad may exhibit different birefringence due to addition of a substance with a large birefringence index or due to a difference in viscosity between the core and the clad when drawing optical fibers. The difference in birefringence between the core and the clad may be given as follows:

$$|\hat{b}_2 - \hat{b}_1| = b_m + b_s \quad \text{(Equation 6)}$$

wherein, $b_m$ is a degree of contribution of added matter to the birefringence and $b_s$ is a degree of contribution to the birefringence due to the residual stress. A substance with large polarizability, such as P and Ge, has a large value of $b_m$. Meanwhile, drawing conditions of optical fibers, including heating temperature, drawing rate and cooling rate, have a large value of $b_s$.

Any difference in cooling rate between the core and the clad, during a process for melting and drawing an optical fiber preform, results in a difference in drawing tension, which is applied to the core and the clad. When an optical fiber is cooled and hardened, the drawing tension remains as a residual stress.

Addition of a substance, such as GE, P, F, and Cl, decreases glass transition temperature and delays hardening or increases a degree of thermal contraction. If substances with different densities are added to the core and the clad, respectively, residual stress discontinuity at an interface between them may occurs due to differences in hardening rate and thermal contraction. Therefore, drawing conditions, including heating rate, drawing rate, and cooling rate, as well as differences in thermal contraction, cooling rate, and glass transition temperature due to a difference in composition between the core and the clad, result in the contribution of $b_s$.

Table 1, as given below, presents a degree of residual stress discontinuity at an interface between a core and a clad of various optical fibers having graded a index distribution. The core and the clad have the same diameter, but different composition. For example, the core may has a radius of 8.5±1.5 μm, 25.0±1.5 μm, or 31.25±1.5 μm and the clad may has a radius of 62.5±2.5 μm.

TABLE 1

| Example | Composition of clad | Composition of deposited clad | Composition of core | Degree of residual stress discontinuity at interface between core and clad |
|---|---|---|---|---|
| 1 | $SiO_2$ |  | $SiO_2$—$GeO_2$ | Continuous |
| 2 | $SiO_2$ | $SiO_2$ | $SiO_2$—$GeO_2$ | Continuous |
| 3 | $SiO_2$ |  | $SiO_2$—$GeO_2$—P | discontinuous |
| 4 | $SiO_2$ |  | $SiO_2$—$GeO_2$—F | discontinuous |
| 5 | $SiO_2$ |  | $SiO_2$—$GeO_2$—$P_2O_5$—F | discontinuous |
| 6 | $SiO_2$ | $SiO_2$—$GeO_2$—$P_2O_5$—F | $SiO_2$—$GeO_2$—$P_2O_5$—F | discontinuous |

In Table 1, the "deposited clad" refers to a clad which is deposited between the clad and the core. The "interface between core and clad" refers to an interface between the core and the deposited clad. In Example 1, the core may be composed of 80-100 wt % of $SiO_2$ and 0-20 wt % of $GeO_2$.

A "residual stress match" occurs when the residual stress discontinuity at the interface between a core and a clad is 20.0 MPa or less. This is represented by an absolute value of a difference between a minimum axial stress at (r/a)=0.8-1.1 and a maximum axial stress at (r/a)=1.0-1.2. In the relation, a is the radius of a core of an optical fiber having a graded index distribution and r is a radius measured from the center of the core.

The United States Publication No. 2002/0126944 entitled "Apparatus and method for measuring residual stress and photo-elastic effect of optical fiber" discloses a method for measuring a birefringence value due to such a residual stress (the contents of which are hereby incorporated by reference). The birefringence value measured by this method is proportional to the sum total of a contribution ($b_m$) due to the core composition as in Equation 6, including Ge, P, and a contribution ($b_s$) of the residual stress. Accordingly, the sum total of birefringence value of Equation 6 is replaced by the axial stress value measured by the above method.

Figure 3:
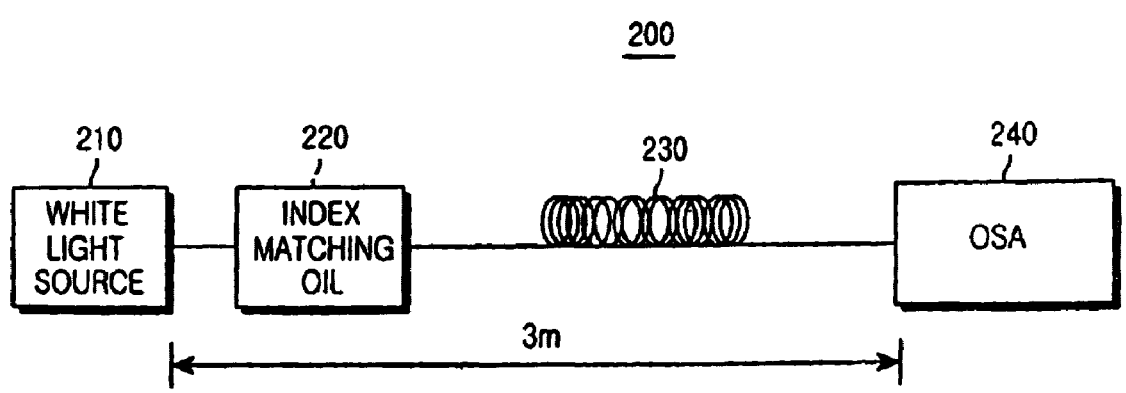
FIG. 3 shows an apparatus for measuring bending loss.

FIG. 3 shows an apparatus 200 for measuring bending loss. The apparatus 200 includes a white light source 210, index matching oil 220, a target optical fiber 230, and an OSA (optical spectrum analyzer) 240. The bending loss is measured by measuring respective loss values before and after winding the target optical fiber 230 fifteen times around a circular bar having a radius of 5 mm. The number of windings of the target optical fiber 230 does not limit the present invention. The white light source 210 outputs light, which passes through the index matching oil 220. After a mode of the light, which propagates to the clad, is eliminated, the light is input to the OSA 240. Measurement length of the target optical fiber 230 is 3 m. However, such a length is not limited to the present invention.

Characteristics of the examples presented in Table 1 will now compared to one another with reference to FIGS. 4 to 10.

Figure 4:
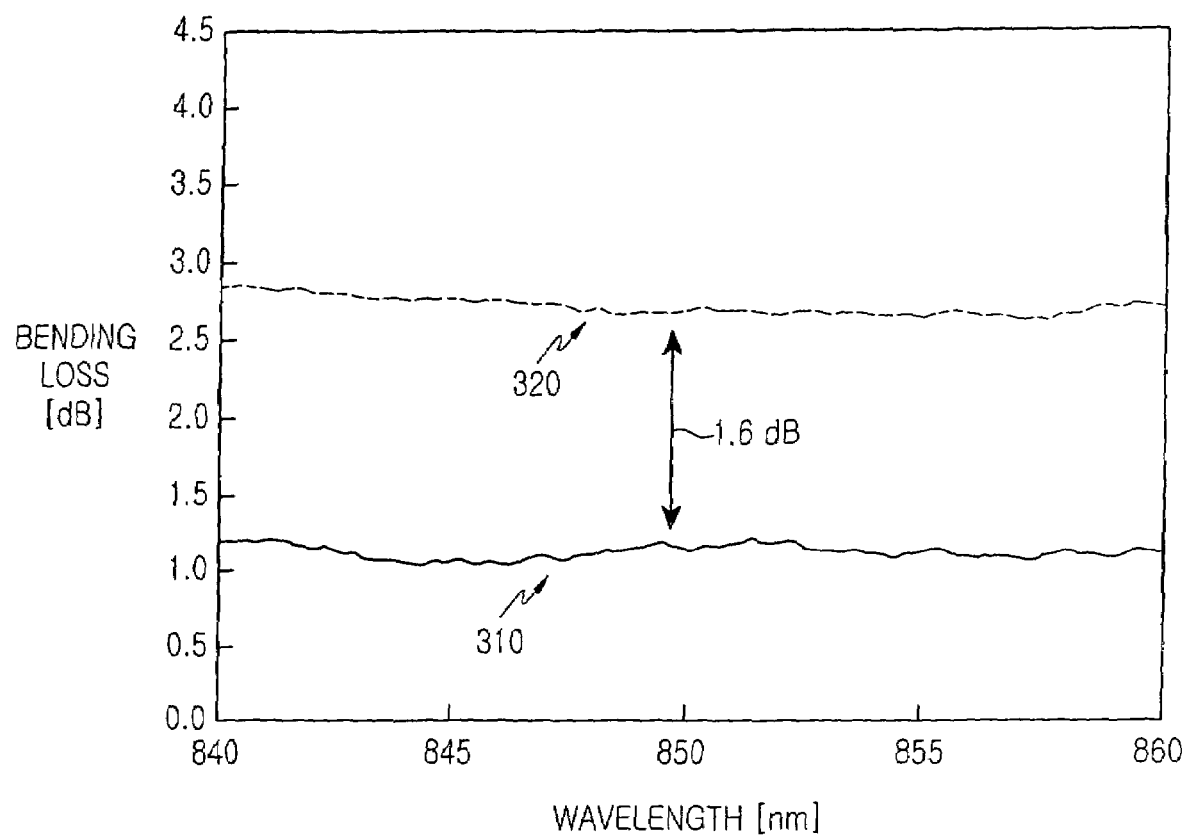
FIGS. 4 to 10 show characteristic values according to the present invention.

FIG. 4 shows a bending loss curve 310 of an optical fiber having low residual stress discontinuity and a bending loss curve 320 of another optical fiber having high residual stress discontinuity. In the wavelength band of 850±10 nm, the optical fiber with low residual stress discontinuity has a bending loss that is about 1.6 dB lower than that of another optical fiber with high residual stress discontinuity.

Figure 5:
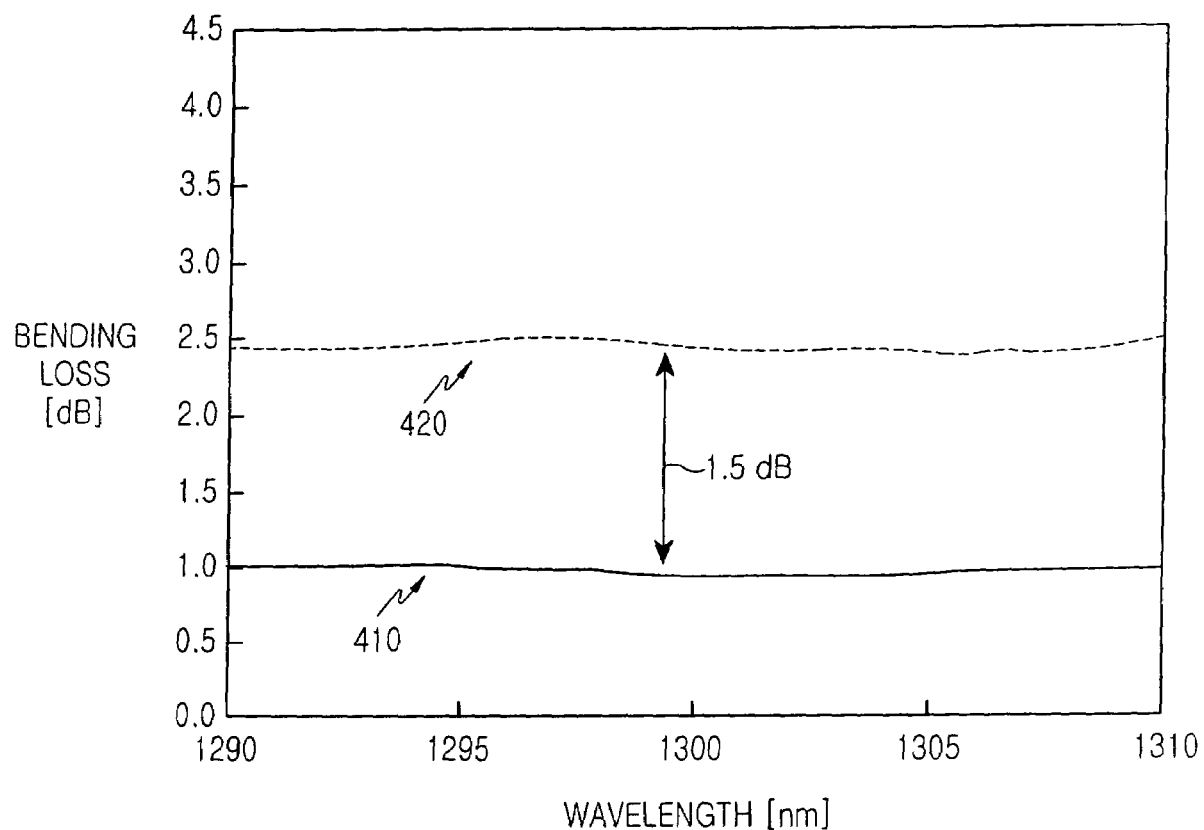

FIG. 5 shows a bending loss curve 410 of an optical fiber having low residual stress discontinuity and a bending loss curve 420 of another optical fiber having high residual stress discontinuity. In the wavelength band of 1300±10 nm, the optical fiber with low residual stress discontinuity has a bending loss that is about 1.5 dB lower than that of another optical fiber with high residual stress discontinuity.

Figure 6:
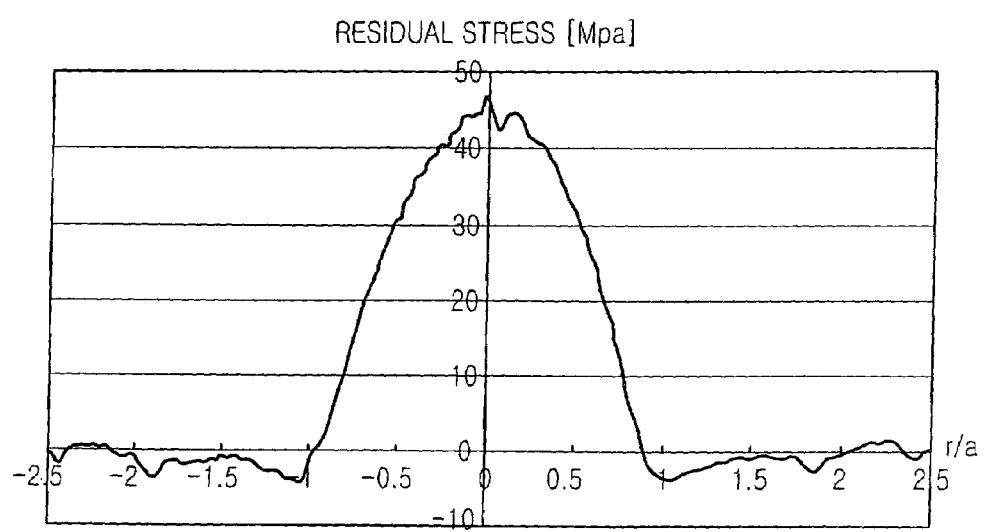

FIG. 6 shows residual stress distributions of Example 1 in Table 1. The residual stress discontinuity is about 2-3 MPa at an interface (r/a=1.0) between a core and a clad.

Figure 7:
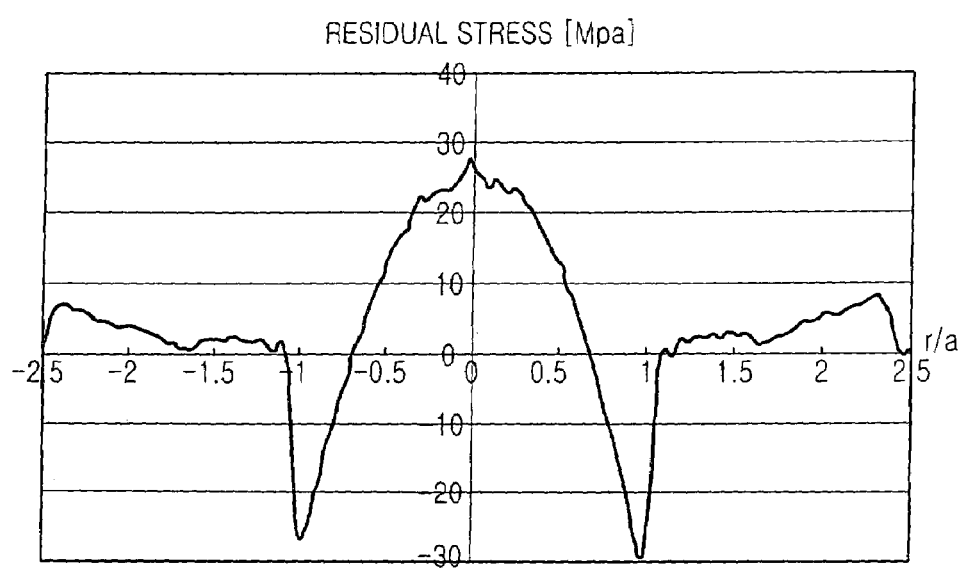

FIG. 7 shows residual stress distributions of Example 3 in Table 1. The residual stress discontinuity is about 25-30 MPa at an interface between a core and a clad.

Figure 8:
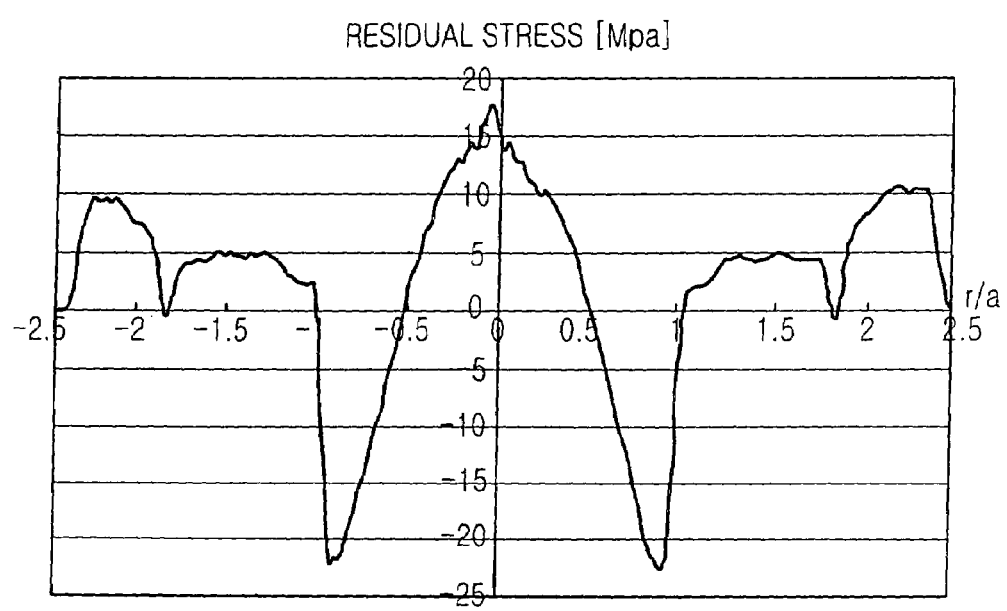

FIG. 8 shows residual stress distributions of Example 4 in Table 1. The residual stress discontinuity is about 25-30 MPa at an interface between a core and a clad.

Figure 9:
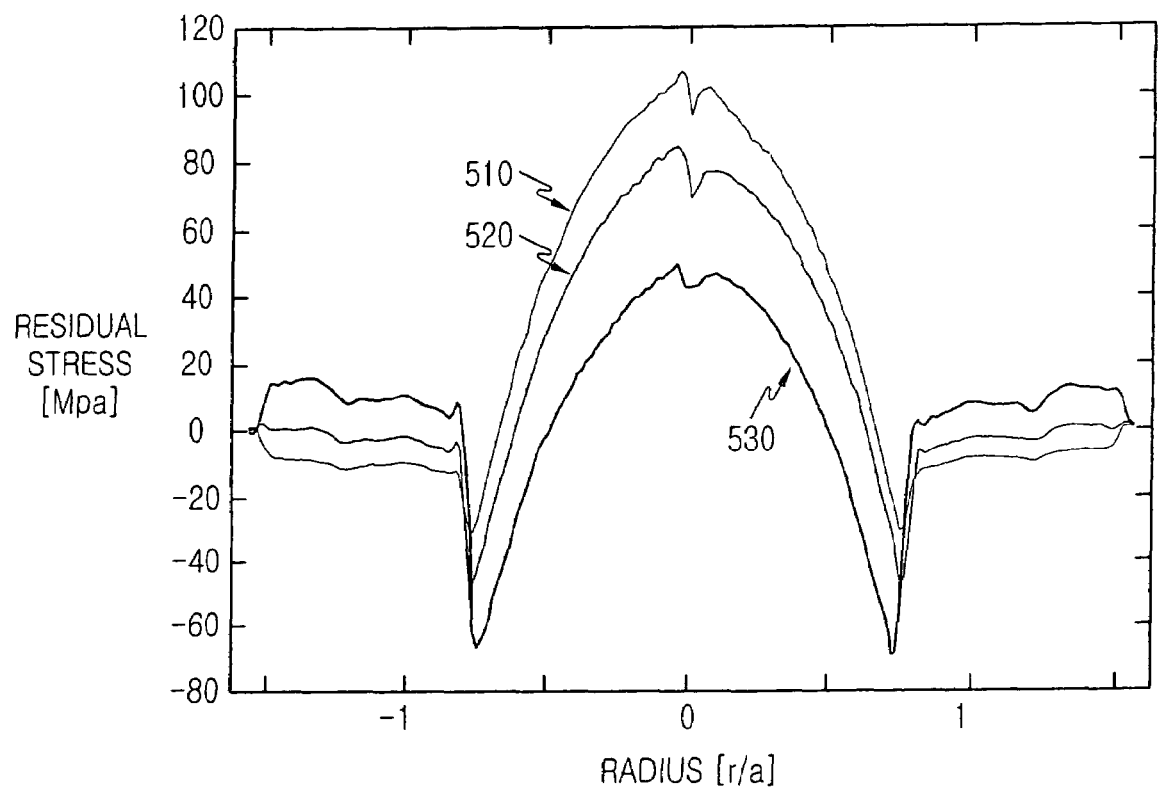

FIG. 9 shows residual stress distribution curves, according to drawing temperature, of optical fibers having high residual stress discontinuity. A first curve 530 has a drawing temperature of 2100° C., a second curve 520 has 2150° C., and a third curve 510 has 2200° C. If the drawing temperature is decreased, the residual stress discontinuity at the interface (r/a=1.0) between the core and the clad is increased from about 25 MPa to about 80 MPa.

Figure 10:
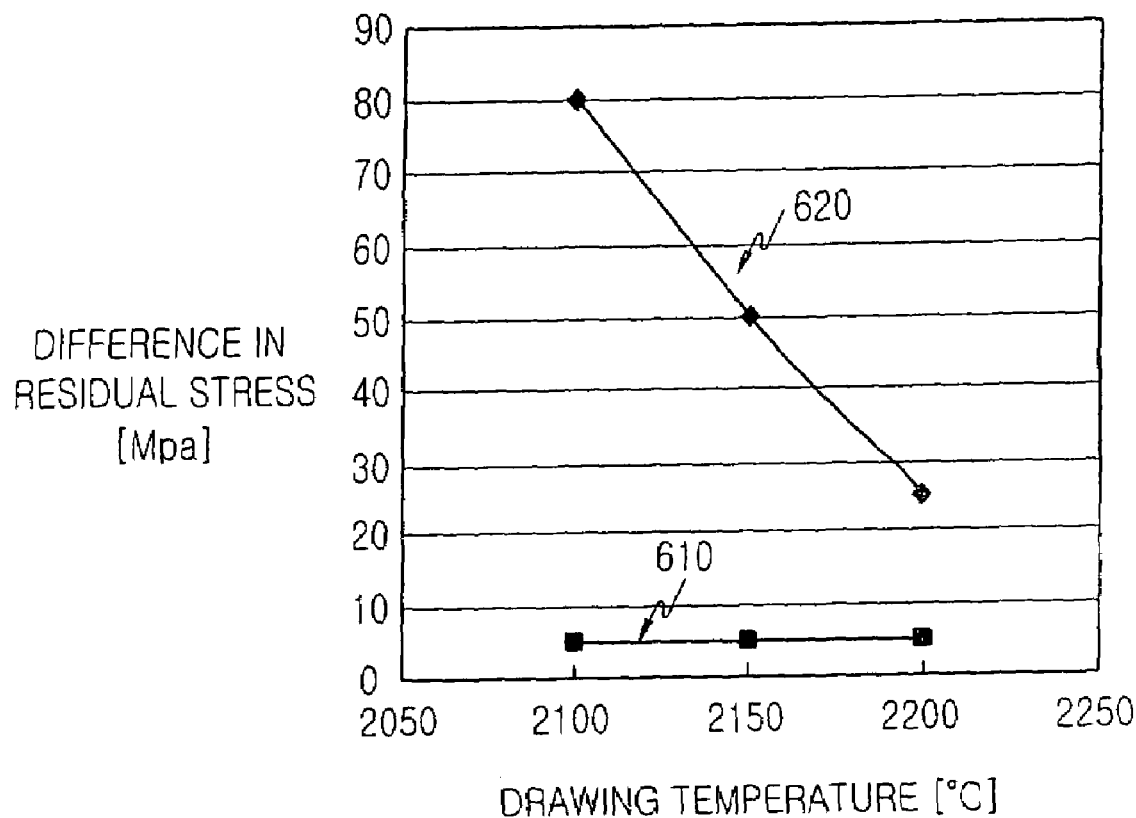
Figure 11:
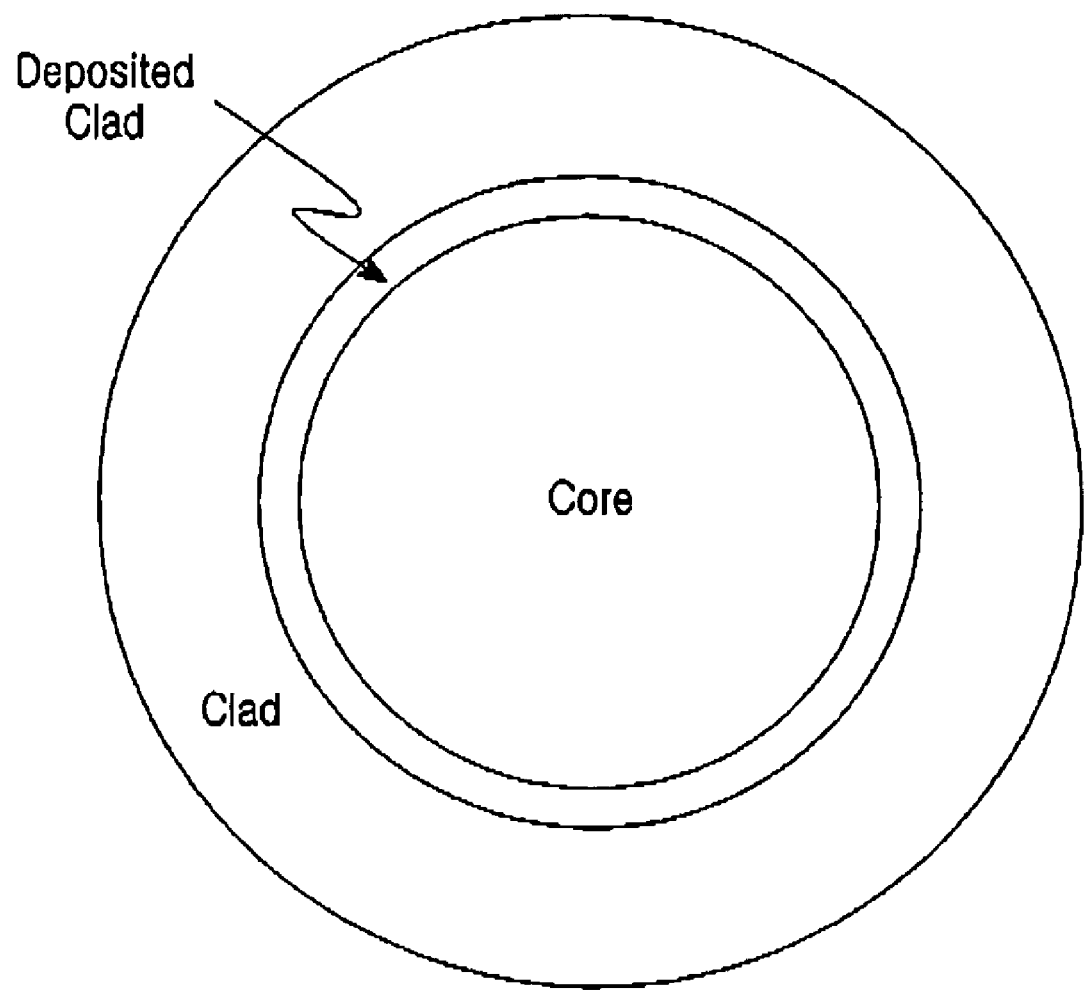
FIG. 11 shows the optical fiber according to the present invention.

FIG. 10 shows the influence of various values of residual stress discontinuity on the composition of a core vs. heating (or drawing) temperature during a process for drawing optical fibers. As the heating temperature is increased to 2,000-2,200° C., the residual stress discontinuity value 620 of Example 3 is changed from about 80 MPa to about 25 MPa, while the residual stress discontinuity value 610 of Example 1 exhibits a trivial amount of change, which is less than 10 MPa.

Accordingly, to the inventors have concluded that the optical fiber of Example 1 has a minimized variation of residual stress discontinuity, as the heating temperature is changed due to a change in shape of a preform during drawing process, deterioration of heating furnace caused by lengthened service time, and the like. This function also makes it possible to control the graded index distribution in an uniform and precise manner and to manufacture optical fibers with transmission capacity of 1 Gbps or more.

As mentioned above, the optical fiber according to the present invention has reduced bending loss and is suitable for installing and operating in complicated vertical or horizontal lines, as well as in narrow conduit lines, such as in access networks, FTTHs, LANs, or WANs. The optical fiber also has optical characteristics suitable for use in a communication network, which has a transmission speed of 1 Gbps or more.

In addition, the optical fiber with a graded index distribution according to the present invention is less sensitive to drawing conditions, as compared to conventional optical fibers.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical fiber comprising:
   a core which is an optical transmission medium; and
   a clad for surrounding the core,
   wherein a residual stress discontinuity at an interface between the core and the clad has a value of 20.0 MPa or less, the value being represented by an absolute value of a difference between a minimum axial stress at r/a=0.8-1.1 and a maximum axial stress at r/a=1.1-1.2, wherein a is the radius of the core and r is a distance from the center of the core, and
   wherein the optical fiber has a bending loss of 2.0 dB or less at a wavelength band of 850±10 nm and at the wavelength band of 1300±10 nm, when measured by winding the optical fiber 15 times around a cylinder having a radius of 5 mm.

2. The optical fiber as claimed in claim 1, wherein the core has a graded index distribution.

3. The optical fiber as claimed in claim 1, wherein the optical fiber includes a multi-mode optical fiber.

4. The optical fiber as claimed in claim 1, wherein the core comprises 0-20 wt % of $GeO_2$.

5. The optical fiber as claimed in claim 1, wherein the clad is composed of $SiO_2$.

6. The optical fiber as claimed in claim 1, wherein the optical fiber has a transmission speed of 1 Gbps or more.

* * * * *

UNITED STATES PATENT AND TRADEMARK OFFICE
CERTIFICATE OF CORRECTION

PATENT NO. : 7,231,121 B2 Page 1 of 1
APPLICATION NO. : 10/919731
DATED : June 12, 2007
INVENTOR(S) : Se Ho Park et al.

It is certified that error appears in the above-identified patent and that said Letters Patent is hereby corrected as shown below:

Title Page
Item [73], Assignee's address, should read as follows:
--Gyeonggi-Do.--

Signed and Sealed this

Fourteenth Day of August, 2007

JON W. DUDAS
*Director of the United States Patent and Trademark Office*